US011980852B1

(12) United States Patent
Larson

(10) Patent No.: US 11,980,852 B1
(45) Date of Patent: May 14, 2024

(54) WINE FUNNEL

(71) Applicant: Jeffrey Larson, Lawrenceville, GA (US)

(72) Inventor: Jeffrey Larson, Lawrenceville, GA (US)

( * ) Notice: Subject to any disclaimer, the term of this patent is extended or adjusted under 35 U.S.C. 154(b) by 640 days.

(21) Appl. No.: 17/220,788

(22) Filed: Apr. 1, 2021

Related U.S. Application Data

(60) Provisional application No. 63/004,285, filed on Apr. 2, 2020.

(51) Int. Cl.

| | |
|---|---|
| ***B01F 25/312*** | (2022.01) |
| ***B01F 23/232*** | (2022.01) |
| ***B01F 101/17*** | (2022.01) |
| ***B67C 11/02*** | (2006.01) |
| *B01F 23/237* | (2022.01) |
| *B67C 11/00* | (2006.01) |

(52) U.S. Cl.
CPC ........ *B01F 25/3121* (2022.01); *B01F 23/232* (2022.01); *B01F 25/31233* (2022.01); *B67C 11/02* (2013.01); *B01F 23/237611* (2022.01); *B01F 2101/17* (2022.01); *B67C 2011/30* (2013.01)

(58) Field of Classification Search
CPC ............ B01F 2101/17; B01F 23/23411; B01F 23/232; B01F 23/236; B01F 23/2361; B01F 23/237612; B01F 25/312; B01F 25/45; B01F 25/4521; B01F 25/45241; B01F 23/2323; B01F 23/2326; B01F 23/234; B01F 23/23413; B01F 23/2364; B01F 25/10; B01F 25/23; B01F 25/25; B01F 25/3121; B01F 25/31241; B01F 25/31242; B01F 25/31243; B01F 25/4231; B01F 25/4321; B01F 25/4523; B01F 33/5011; B01F 35/71745
USPC .............................................. 99/277.1, 323.1
See application file for complete search history.

(56) References Cited

U.S. PATENT DOCUMENTS

| | | | | | |
|---|---|---|---|---|---|
| 4,211,244 | A * | 7/1980 | Williams | A24F 13/00 | 131/194 |
| 5,713,263 | A * | 2/1998 | Burks, III | C12H 1/00 | 99/323.1 |
| 6,279,598 | B1 * | 8/2001 | Boticki | E03C 1/046 | 137/216 |
| 6,425,421 | B1 | 6/2002 | Morrisson | | |

(Continued)

FOREIGN PATENT DOCUMENTS

| | | |
|---|---|---|
| CN | 20304368 | 7/2013 |
| CN | 102349810 | 9/2013 |

(Continued)

*Primary Examiner* — Chris Q Liu
(74) *Attorney, Agent, or Firm* — Kenneth L. Tolar

(57) ABSTRACT

A wine funnel for facilitating the transfer of wine from a bottle to a decanter includes a frustoconical housing having a top wall, a substantially continuous outer wall, and a lower end. Centrally positioned on the top wall is an elevated ball for dispersing wine into smaller, multidirectional streams. The top wall also includes a plurality of concentric grooves that trap sediment from wine deflected by the ball. The grooves are in fluid communication with an internal spiraled passageway having a plurality of venturi ports for efficiently importing ambient air into wine as it flows through the housing and into a decanter or wine glass.

5 Claims, 4 Drawing Sheets

(56) References Cited

U.S. PATENT DOCUMENTS

| | | | | |
|---|---|---|---|---|
| 6,568,660 | B1 | 5/2003 | Flanbaum | |
| 2011/0274805 | A1 | 11/2011 | Nudi, Jr. | |
| 2012/0156345 | A1 * | 6/2012 | Agarwal | B01F 25/31242 426/474 |
| 2016/0067655 | A1 * | 3/2016 | Roberts | C12G 1/00 261/66 |
| 2016/0199794 | A1 * | 7/2016 | Connors | B01F 23/23123 261/64.1 |
| 2018/0056259 | A1 * | 3/2018 | Roberts | B01F 25/31241 |
| 2018/0250643 | A1 * | 9/2018 | Benati | B01F 23/23411 |

FOREIGN PATENT DOCUMENTS

| | | |
|---|---|---|
| CN | 103663325 | 3/2014 |
| WO | WO 9513220 | 5/1995 |

* cited by examiner

WINE FUNNEL

CROSS REFERENCE TO RELATED APPLICATIONS

This application claims priority of provisional application No. 63/004,285 filed on Apr. 2, 2020, the specification of which is incorporated herein by reference.

BACKGROUND OF THE INVENTION

The present invention relates to uniquely designed wine funnel for conveniently transferring wine from a bottle to a decanter, while simultaneously aerating the wine and removing sediment.

DESCRIPTION OF THE PRIOR ART

Wine is often poured from a bottle into a decanter before consumption to remove entrained sediment and to expose the wine to more oxygen, i.e., allowing the wine to "breathe." Oxygen interacts with chemical compounds to improve the bouquet and/or flavor of the wine. Full-bodied and bolder red wines are particularly suitable for decanting.

Once transferred to a decanter, the wine must sit for a significant duration until sufficiently oxygenated and clarified. Therefore, if a consumer wishes to immediately drink a corked bottled of wine, he or she must forego the advantages of decanting. To expedite the protracted decanting process, venturis are often used to aerate wine as it is poured from a bottle. Therefore, a consumer can aerate each glass of wine as it is poured instead of first aerating the entire bottle.

Older wines are often preferred to younger wines because they include multiple layers that each vary in flavor and intensity. However, pouring an older wine through a conventional venturi destroys the layers thereby eliminating one of its most desirable qualities.

Accordingly, there is currently a need for a decanting device that overcomes the aforementioned problems associated with aerating and clarifying bottled wine. A review of the prior art reveals a few devices that purportedly enhance decanting.

For example, U.S. Pat. No. 6,425,421 to Morrison discloses a device for transferring fluid from a wine bottle to a decanter including a pump on the neck bottle and a rack for supporting the wine bottle at an angular orientation.

U.S. Pat. No. 6,568,660 to Flanbaum discloses an aerating pouring spout for a wine bottle.

U.S. patent publication 2011/0274805 to Nudi, Jr. discloses a wine decanting funnel including a first liquid-receiving compartment having a fluid outlet superimposed on a mound that spreads flowing wine. The wine is then diverted into a second compartment and then a dispensing tube for transfer to an accompanying cask.

International patent publication no. WO 95/13220 to Lindholm discloses a pouring spout for bottles that minimizes drippage and allows air inflow.

Chinese patent publication no. CN 10234981 discloses a decanter having an internal input funnel, a mixing chamber, an outlet funnel, and an internal mound for spreading and aerating incoming wine.

Chinese patent publication no. CN 103663325 discloses a wine pourer including a gasket that is secured to the upper end of a wine bottle. A spout is connected to the dispensing opening of the bottle and is tethered to the gasket.

Chinese patent no. CN 203043681 discloses a wine funnel including a fluid compartment in communication with a screened dispensing nozzle for removing debris.

Although several decanting attachments and wine funnels exist in the prior art, they are complex and require either a decanter for aeration or employ ineffective aerating techniques that destroy wine layers as described above. Furthermore, most rely on metal screens to remove sediment, which negatively impact taste. For example, though Nudi discloses pouring wine over a mound to spread wine into multiple streams, the device includes no means for injecting ambient air or for effectively separating and collecting entrained sediment.

The present invention overcomes the disadvantages of the prior art by providing a wine funnel having a raised ball for initially separating wine into multiple streams, concentric grooves for removing and collecting sediment from the separated streams, and a spiraled passageway with venturi ports for injecting ambient air into the wine. Accordingly, the wine is clarified and aerated as it is conveniently transferred to a decanter for further aeration and clarification, if necessary or desired.

SUMMARY OF THE INVENTION

The present invention relates to a wine funnel for facilitating the transfer of wine from a bottle to a decanter. The device includes a frustoconical housing having a top wall, a substantially continuous outer wall, and a lower end. Centrally positioned on the top wall is an elevated ball for dispersing wine into smaller, multidirectional streams. The top wall also includes a plurality of concentric grooves that trap sediment from wine deflected by the ball. The grooves are in fluid communication with an internal spiraled passageway having a plurality of venturi ports for efficiently importing ambient air into wine as it flows through the housing and into a decanter or wine glass.

It is therefore an object of the present invention to provide a wine funnel that facilitates transferring wine from a bottle to a decanter.

It is therefore another object of the present invention to provide a wine funnel that aerates wine as it is transferred from a bottle to a decanter.

It is yet another object of the present invention to provide a wine funnel that removes sediment from wine as it is being transferred from a bottle to a decanter.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
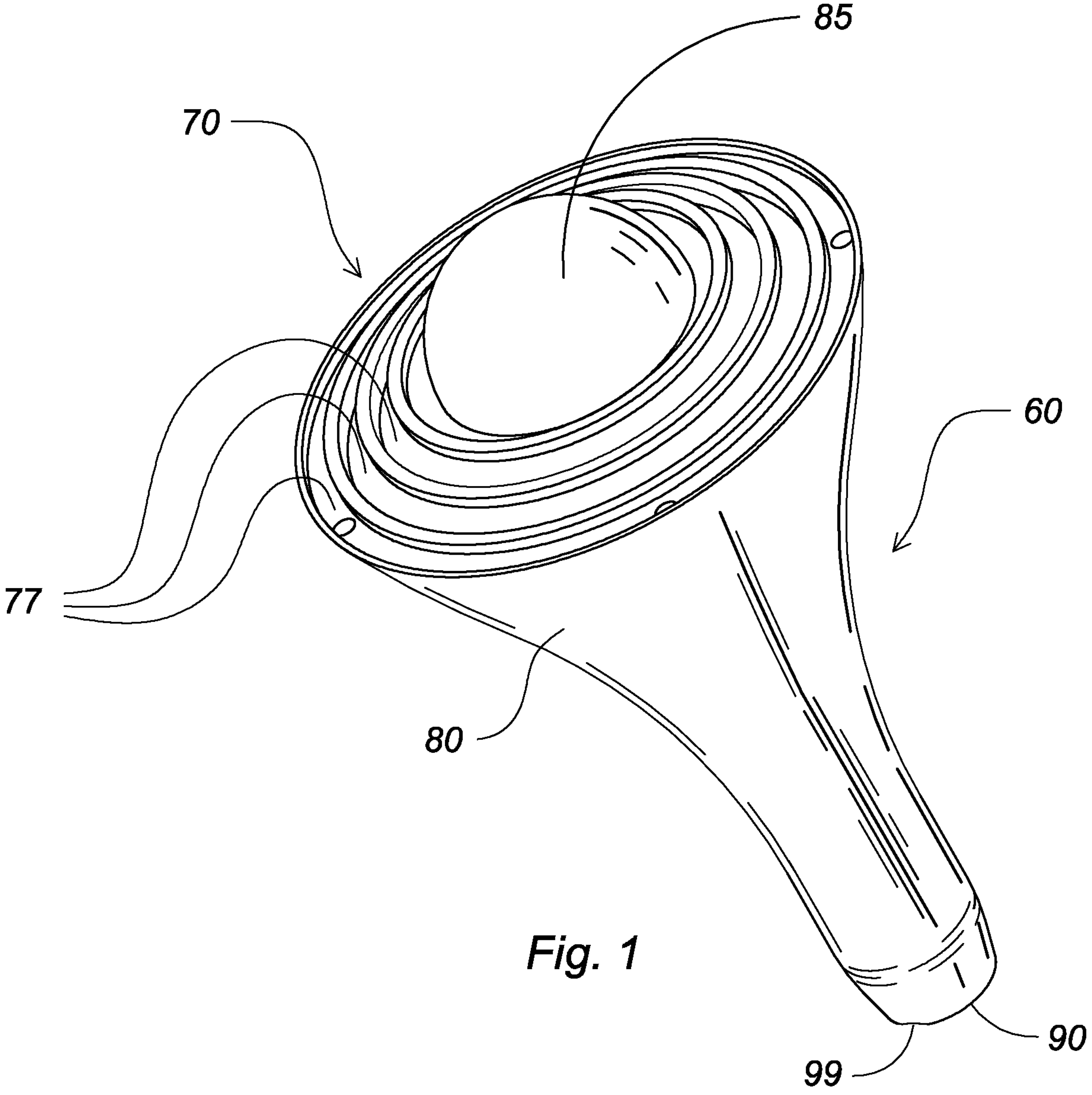
FIG. 1 is a perspective view of the wine funnel according to a first embodiment of the present invention.
Figure 2:
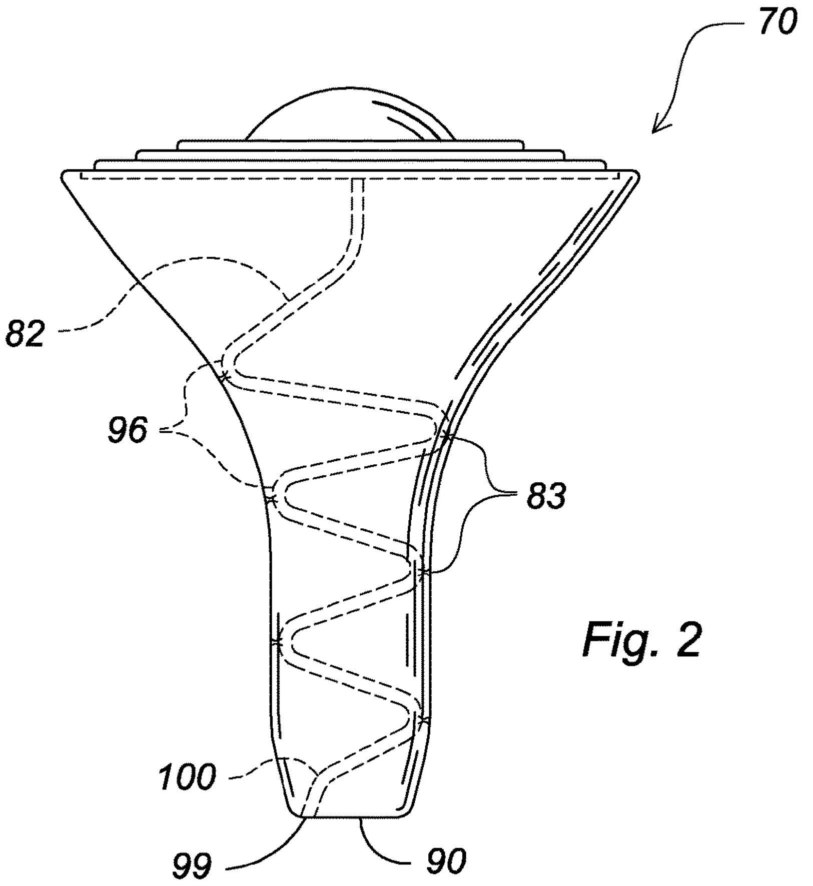
FIG. 2 is a front, plan view of the wine funnel of FIG. 1.
Figure 3:
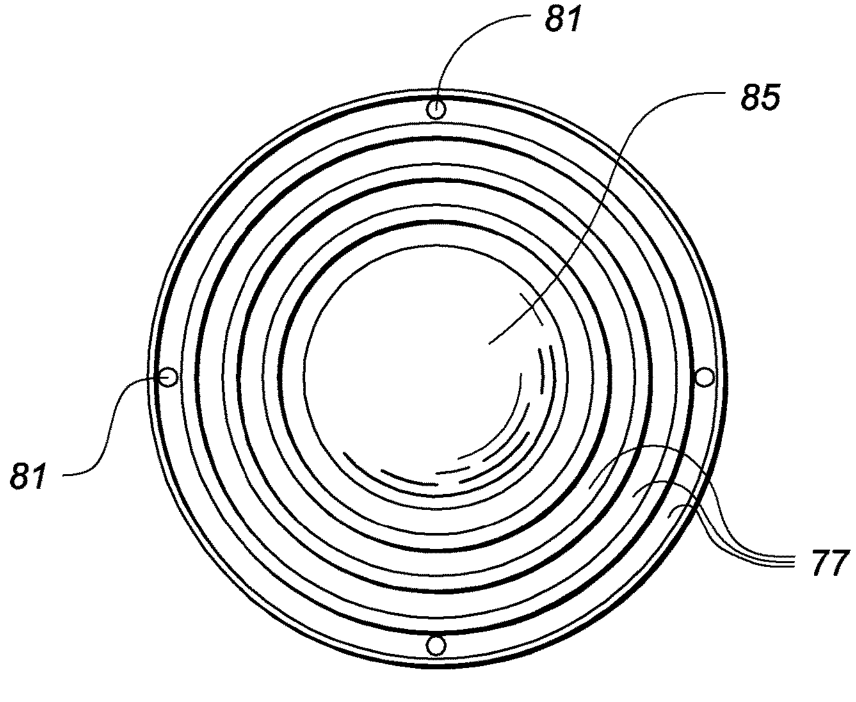
FIG. 3 is a top view of the wine funnel of FIGS. 1 and 2.
Figure 4:
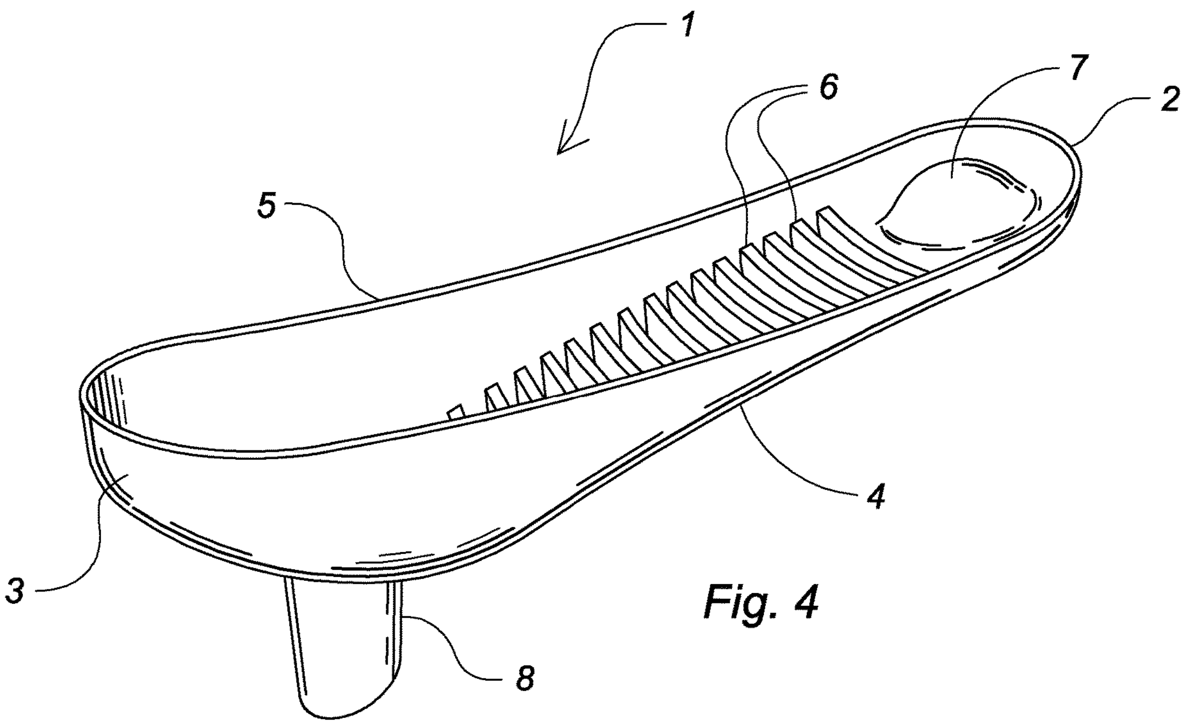
FIG. 4 is a perspective, side view of the wine funnel according to a second embodiment of the present invention.
Figure 5:
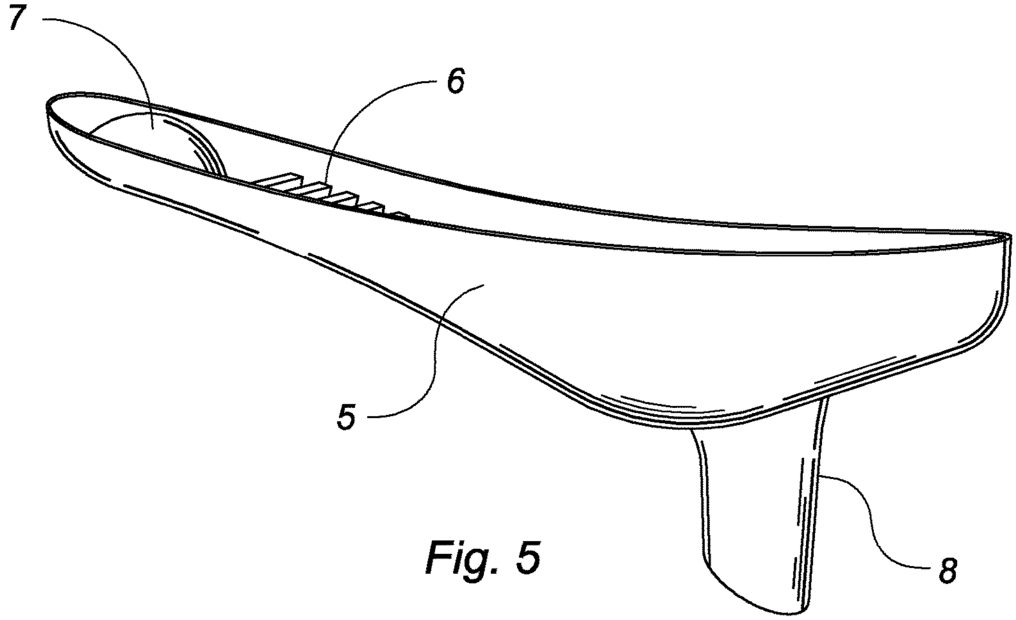
FIG. 5 is a perspective view of the funnel from a side opposite that of FIG. 4.
Figure 6:
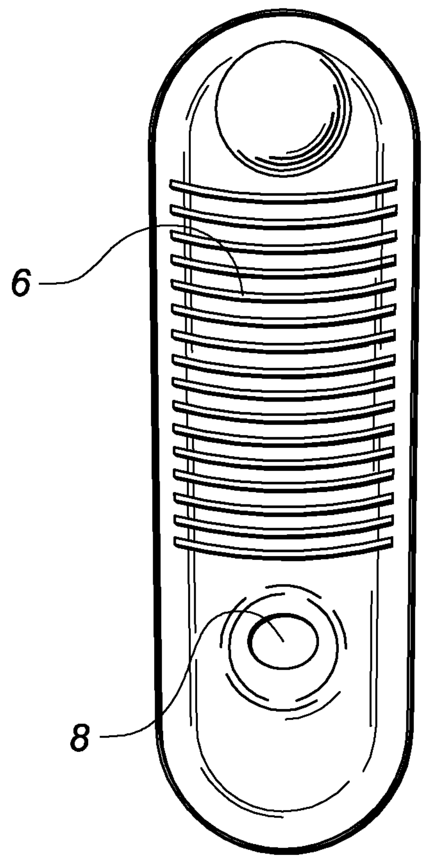
FIG. 6 is a top view of the wine funnel of FIGS. 4 and 5.
Figure 7:
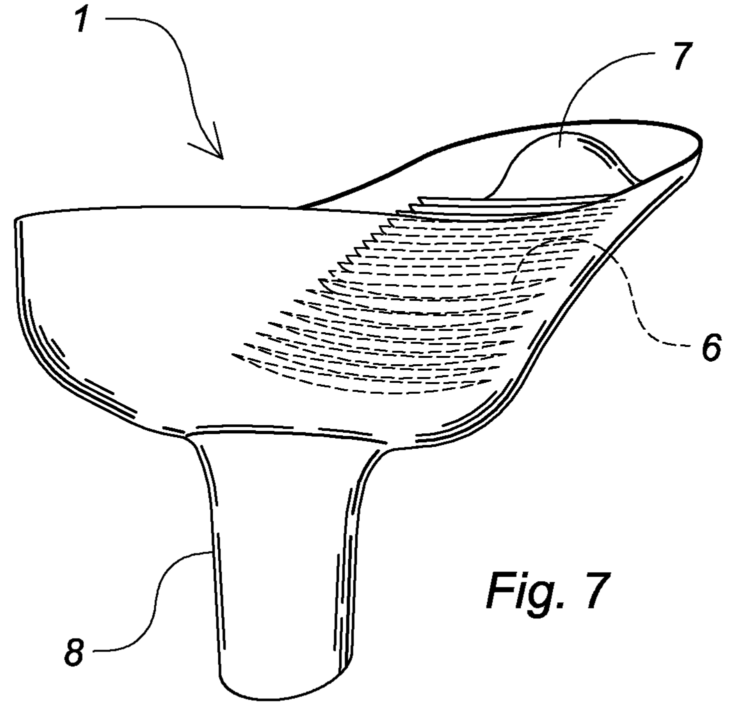
FIG. 7 is a lower, end view of the wine funnel of FIGS. 4 and 5.

The present invention relates to a wine funnel for facilitating the transfer of wine from a bottle to a decanter. Now referring specifically to FIGS. 1-3, a first embodiment includes a frustoconical or cyclonically shaped housing 60 having a top wall 70, a substantially continuous outer wall 80, and a lower end 90. The top wall slopes downwardly from a center toward the outer wall. Centrally positioned on the top wall is an elevated ball 85 or bulbous projection for dispersing wine into smaller multidirectional streams.

On the top wall of the housing are a plurality of concentric grooves 77 for collecting wine deflected by the ball. After wine strikes the ball, it flows downwardly on the sloped top wall from an innermost groove toward the outermost groove. The outermost groove includes a plurality of exit apertures 81 in fluid communication with an internal tubular passageway 82. The passageway traverses a spiraled path from the top wall 70 to the lower end 90 of the housing. On the outer wall of the housing are a plurality of venturi ports 83 aligned with each passageway turn 96. Each venturi port 83 is in fluid communication with the passageway 82 for efficiently importing ambient air into wine as it flows toward the lower end of the housing. The spiraled passageway creates a longer path for the wine to travel though the housing so that a greater number of venturi ports can be used to maximize air infusion.

The passageway terminates at an exit port 99 at the lower end of the housing for delivering wine to a decanter or wine glass. The terminus 100 of the passageway and the exit port 99 extend at a predetermined angle relative to a vertical plane. Accordingly, wine exiting at an oblique angle will be further aerated as it flows into the decanter and will create a cascading effect in the decanter to enhance the presentation of a given wine.

Accordingly, to aerate and condition a wine, a user pours the wine onto the elevated ball 85. The wine flows in multiple directions into the inner grooves and eventually toward the outer grooves. As the wine flows outwardly, the grooves separate and collect sediment until it enters the spiraled passageway, where ambient air is injected at each turn. The stream exits the angled discharge port where it is further aerated and cascaded into the decanter.

Now referring to FIGS. 4-7, a second embodiment includes a trough 1 having an upper end 2, a lower end 3, a bottom wall 4 that slopes downwardly from the upper end to the lower end, and a continuous peripheral wall 5. A plurality of spaced baffles 6 are positioned on the bottom wall for gently aerating and removing sediment from flowing wine. At the upper end of the bottom wall is a bulbous projection 7 for spreading incoming wine before contacting the baffles. On the bottom surface of the trough, near the lower end, is a dispensing spout 8 dimensioned to fit within a given decanter mouth. Preferably, the trough is counterweighted such that it will remain upright in the decanter mouth without additional support.

Accordingly, a user places the spout into a decanter mouth and opens a desired wine bottle. Wine is poured from the bottle onto the protrusion where it flows down the trough toward the spout. As the wine flows over the baffles, they trap entrained sediment and gently aerate the wine. The partially aerated, clarified wine then flows into the decanter where it can be further aerated or immediately consumed.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A wine funnel comprising:
- a housing having a top wall, an outer wall, and a lower end;
- an elevated ball positioned on the top wall of said housing for dispersing wine into smaller multidirectional streams;
- a plurality of concentric grooves on the top wall of said housing for collecting wine deflected by the ball and for removing sediment from said wine;
- an internal passageway within said housing and in fluid communication with said grooves;
- a plurality of venturi ports on the outer wall of the housing, each of said venturi ports in fluid communication with said passageway for injecting ambient air into said wine.

2. The wine funnel according to claim 1 wherein said top wall slopes downwardly from said elevated ball toward the outer wall.

3. The wine funnel according to claim 1 wherein said passageway traverses a spiraled path from the top wall to the lower end of the housing.

4. The wine funnel according to claim 3 wherein said passageway includes an outlet at the lower end of the housing for delivering wine to a decanter or wine glass.

5. The wine funnel according to claim 4 wherein the outlet of said passageway extends at a predetermined angle relative to a vertical plane to project wine at an oblique angle to further aerate wine and to create a cascading effect in a receiving container.

* * * * *